United States Patent [19]
Beauchamp

[11] Patent Number: 5,693,219
[45] Date of Patent: Dec. 2, 1997

[54] APPARATUS FOR BACKWASHING A WATER FILTER

[76] Inventor: William J. Beauchamp, 8392 Argentine Rd., Linden, Mich. 48451

[21] Appl. No.: 595,032

[22] Filed: Jan. 31, 1996

[51] Int. Cl.⁶ .................... B01D 35/143; B01D 29/66
[52] U.S. Cl. .................... 210/136; 137/511; 137/625.46; 210/275; 210/278; 210/425; 210/541
[58] Field of Search .................... 210/136, 275, 210/277, 278, 333.01, 333.1, 340, 341, 411, 425, 426, 427, 443, 541; 137/599.1, 625.29, 625.46, 625.47

[56] References Cited

U.S. PATENT DOCUMENTS

| | | | |
|---|---|---|---|
| 2,434,958 | 1/1948 | Quinn | 210/443 |
| 2,679,319 | 5/1954 | Walker. | |
| 2,948,398 | 8/1960 | Engholdt. | |
| 3,021,276 | 2/1962 | Mast. | |
| 3,286,842 | 11/1966 | De Jong. | |
| 3,698,554 | 10/1972 | Mail | 210/275 |
| 3,841,485 | 10/1974 | Malkin | 210/275 |
| 3,954,620 | 5/1976 | Nebolsine | 210/275 |
| 4,102,786 | 7/1978 | Okada et al. | 210/275 |
| 4,191,652 | 3/1980 | Whitmore | 210/274 |
| 4,451,361 | 5/1984 | Paterson | 210/136 |
| 4,486,307 | 12/1984 | Weiler | 210/275 |
| 4,632,150 | 12/1986 | Gagas | 137/625.46 |
| 5,089,117 | 2/1992 | Nichols | 210/93 |
| 5,122,287 | 6/1992 | Hsuing | 210/792 |
| 5,137,645 | 8/1992 | Miller | 210/793 |
| 5,145,588 | 9/1992 | Pedersen. | |
| 5,160,613 | 11/1992 | Walter | 210/274 |
| 5,167,840 | 12/1992 | Jaccarino | 210/794 |
| 5,244,013 | 9/1993 | Gagas | 137/625.46 |
| 5,288,398 | 2/1994 | Angelino | 210/89 |
| 5,288,399 | 2/1994 | Schulz | 210/108 |
| 5,350,505 | 9/1994 | Tang | 210/108 |
| 5,364,525 | 11/1994 | Hagqvist et al. | 210/190 |

*Primary Examiner*—Joseph W. Drodge
*Attorney, Agent, or Firm*—Howard & Howard

[57] ABSTRACT

An adapter valve for backwashing a water filter is releasably connected between the water filter housing cover and enclosure. The adapter valve includes a body having a source port for fluid communication with an inlet port of the cover, a storage port for fluid communication with an outlet port of the cover, a filter inlet port for fluid communication with an inlet port of the enclosure, a filter outlet port for fluid communication with an outlet port of the enclosure, a backwash port for fluid communication with a backwash tank, a discharge port for fluid communication with a discharge line and a cavity in fluid communication with the source, filter and discharge ports. A check valve is positioned between the filter outlet port and the storage port and between the backwash port and the storage port for permitting fluid flow to a storage tank during normal operation and for blocking fluid flow from the storage tank during backwash operation. A rotary valve retained in the cavity is actuatable between a normal mode permitting fluid flow from a water source through the filter to a storage tank and a filter backwashing mode permitting fluid flow from a backwash tank through the filter in the opposite direction to a discharge line.

12 Claims, 2 Drawing Sheets

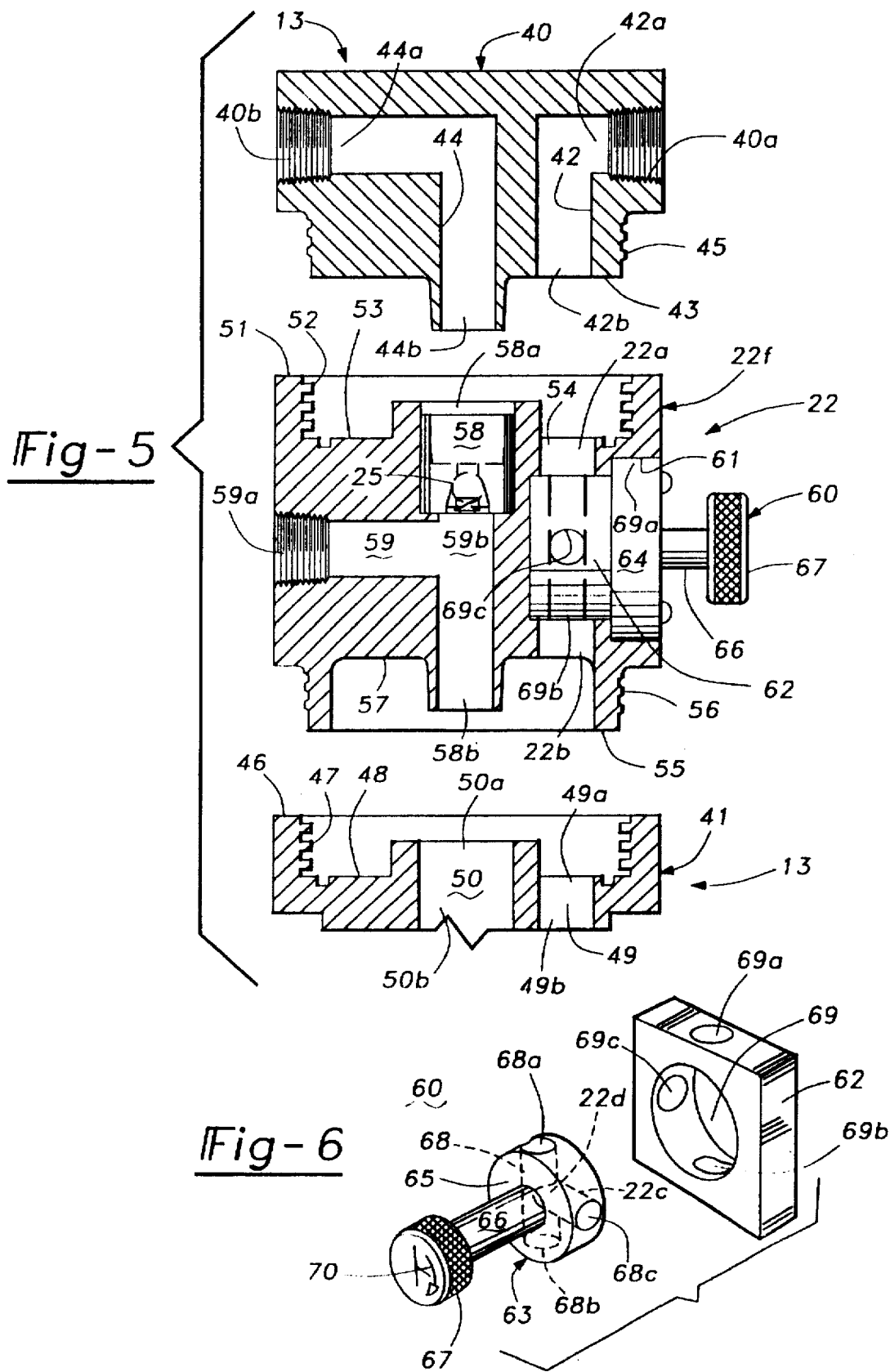

APPARATUS FOR BACKWASHING A WATER FILTER

BACKGROUND OF THE INVENTION

The present invention relates generally to water filtration systems and, in particular, to an apparatus for backwashing a water filter.

SUMMARY OF THE INVENTION

The present invention concerns an apparatus for incorporating a backwash system into a conventional water filtration system. The water filter includes a filter housing cover having a first port for connection to a source of water and a second port for connection to a water storage tank and a filter housing enclosure for retaining water filter material. An adapter valve for the water filter includes an adapter body adapted to be connected between the filter housing cover and the filter housing enclosure. The adapter body has formed therein a source port for fluid communication with an inlet port of the filter housing cover, a storage port for fluid communication with an outlet port of the filter housing cover, a filter inlet port for fluid communication with an inlet port of the filter housing enclosure, a filter outlet port for fluid communication with an outlet port of the filter housing enclosure, a backwash port for fluid communication with a backwash tank, a discharge port for fluid communication with a discharge line and a cavity in fluid communication with the source, filter and discharge ports.

The adapter valve also includes a check valve positioned between the filter outlet port and the storage port and between the backwash port and the storage port for blocking fluid flow from the storage port to the backwash port and the filter outlet port and a rotary valve retained in the adapter body cavity. The rotary valve has a valve element body with a generally T-shaped passage formed therethrough, a valve body with a central aperture formed therein for rotatably retaining the valve element body and means for selectively rotating the valve element body between a normal mode position permitting fluid flow from the source port to the filter inlet port through the valve body and the T-shaped passage and blocking fluid flow to the discharge port and a filter backwashing mode position permitting fluid flow from the filter inlet port to the discharge port through the valve body and the T-shaped passage and blocking fluid flow to the source port. A plate is attached to the adapter body for retaining the valve element body and the valve body in the cavity.

The adapter body has a pair of generally parallel internal passages formed therein one of the passages being connected between the source port and the filter inlet port and having the cavity positioned therein and another of the passages being connected between the filter outlet port and the storage port and having the check valve positioned therein. The adapter body also has a third passage formed therein being connected between the backwash port and the another passage between the check valve and the filter outlet port.

BRIEF DESCRIPTION OF THE DRAWINGS

The above, as well as other advantages of the present invention, will become readily apparent to those skilled in the art from the following detailed description of a preferred embodiment when considered in the light of the accompanying drawings in which:

FIG. 5 is an exploded cross-sectional view of an adapter used in the filter backwashing apparatus shown in the FIG. 2; and FIG. 6 is an exploded perspective view of a valve portion of the adapter shown in the FIG. 5.

DESCRIPTION OF THE PREFERRED EMBODIMENT

Figure 1:
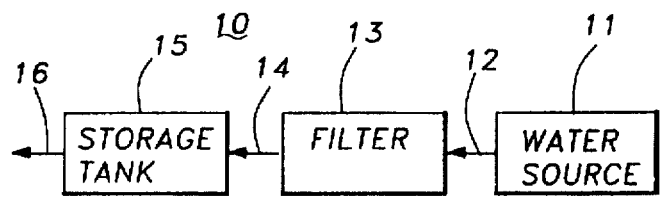
FIG. 1 is a schematic block diagram of a prior art water supply and filtration system.

There is shown in the FIG. 1 a typical prior art water supply and filtration system 10 which is utilized to supply homes and small businesses. A water source 11, typically a well, supplies water through a filter 13 to a storage tank 15. The water source is connected by a source supply line 12 to an input of the filter 13 and an output of the filter 13 is connected by a filter outlet line 14 to an inlet of the storage tank 15. An outlet of the storage tank 15 is connected by a system supply line 16 to the plumbing in the building. A major problem with such prior art systems is that the filter 13 tends to collect deposits as the water flows from the source 11 to the storage tank 15 which deposits decrease the flow of the water and make the system less efficient.

Figure 2:
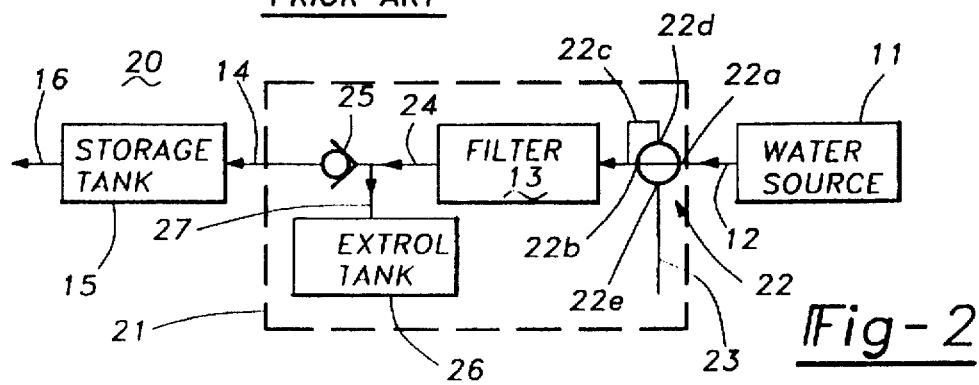
FIG. 2 is a schematic diagram of a water supply and filtration system in the normal operating mode incorporating a filter backwashing apparatus in accordance with the present invention.

There is shown in the FIG. 2 a water supply and filtration system 20 which incorporates a filter backwashing apparatus 21 made in accordance with the present invention. The source supply line 12 is connected to an inlet or first port 22a of an adapter valve 22. The adapter valve 22 has an inlet/outlet or second port 22b connected to the inlet of the filter 13. A bypass conduit 22c is connected between the second port 22b and an inlet or third port 22d. The adapter valve 22 also has an outlet or fourth port 22e connected to a discharge line 23. The output of the filter 13 is connected through a check valve 25 to the filter outlet line 14 for permitting water flow from the filter 13 to the storage tank 15 and for blocking water flow from the storage tank 15 back to the filter 13. An Extrol tank 26 has an inlet/outlet connected by a line 27 to a check valve connecting line 24 connected between the outlet of the filter 13 and the check valve 25.

The adapter valve 22 is shown in the normal operating position wherein water from the water source 11 flows through the line 12 into the first port 22a, through the valve 22 and out of the second port 22b to the filter 13. The water continues to flow from the filter 13 through the connecting line 24, the check valve 25, the filter outlet line 14 to the storage tank 15. Water flowing out of the filter 13 through the connecting line 24 also flows into the Extrol tank 26 through the Extrol tank line 27 to fill the Extrol tank.

Figure 3:
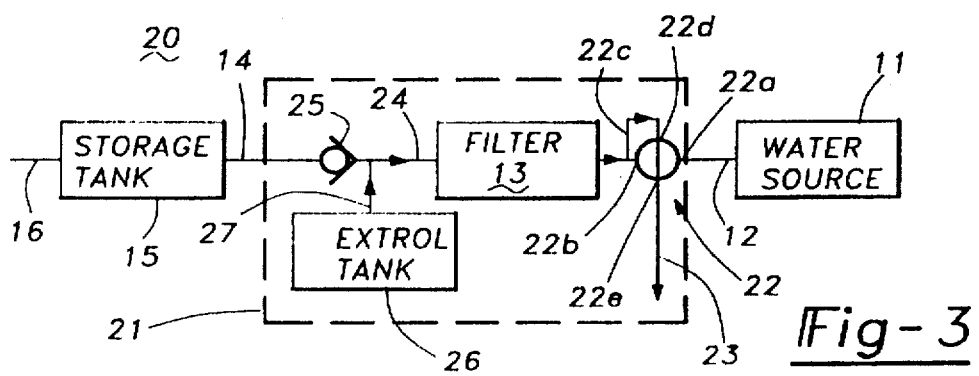
FIG. 3 is a schematic diagram of the system shown in the FIG. 2 in the filter backwashing mode.

There is shown in the FIG. 3 the water supply and filtration system 20 with the filter and backwash subsystem 21 in the backwash mode of operation. The adapter valve 22 has been actuated to disconnect the first port 22a from the second port 22b so that no water flows from the water source 11 through the source supply line 12 and into the filter 13. In this position of the adapter valve 22, the second port 22b is connected through the bypass conduit 22c to the third port 22d. The third port 22d is connected through the body of the valve to the fourth port 22e to permit water flow from the filter 13 through the adapter valve 22 to the discharge line 23. The check valve 25 blocks water flow from the storage tank 15 through the filter outlet line 14 to the filter 13. However, the Extrol tank 26, which has been pressured from the flow of water from the water source 11 through the filter 13 to the storage tank 15 now supplies water through the Extrol tank line 27, and the check valve connecting line 24 to the outlet of the filter 13. This water flows backwards through the filter 13 and out of the inlet of the filter to the second port 22b of the adapter valve wherein the water flows through the bypass conduit 22c and the valve 22 to the discharge line 23. When the filter 13 has been sufficiently backwashed, the valve 22 is returned to the normal operating position shown in the FIG. 2 to resume the supply of water from the water source 11 through the filter 13 to the storage tank 15 and to replenish the water in the Extrol tank 26 for a subsequent backwashing operation.

Figure 4:
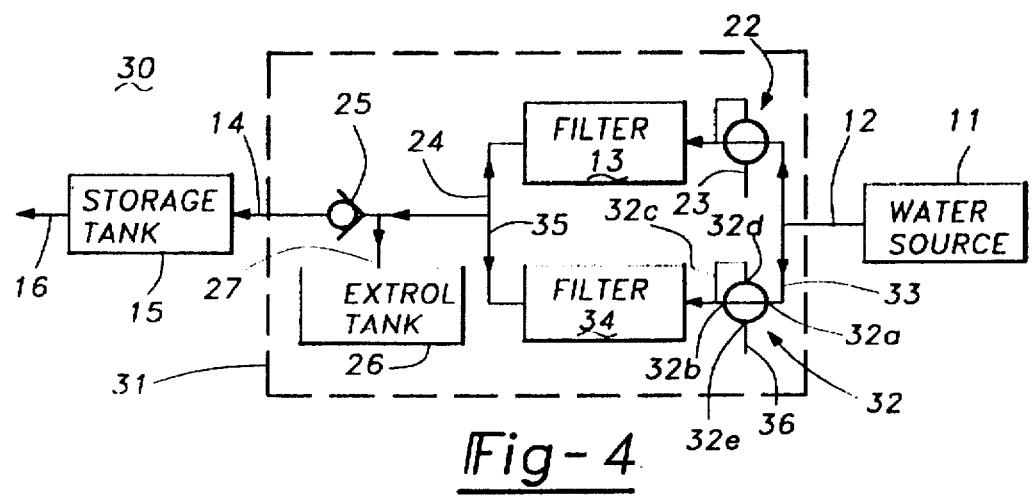
FIG. 4 is a schematic diagram of an alternate embodiment of the water supply and filtration system shown in the FIG. 2.

There is shown in the FIG. 4 an alternate embodiment of the filter and backwash subsystem 21 shown in the FIG. 2. A water supply and filtration system 30 includes the water source 11, the source supply line 12, the filter 13, the filter outlet line 14, the storage tank 15, the system supply line 16, the adapter valve 22, the discharge line 23, the check valve connecting line 24, the check valve 25, the Extrol tank 26, and the Extrol tank line 27. However, the water supply and filtration system 30 includes a filter and backwash subsystem 31 which incorporates a second adapter valve 32 and a second filter. An inlet line 33 is connected between the source supply line 12 and an inlet or first port 32a of the second adapter valve 32. The second adapter valve 32 has an inlet/outlet or second port 32b connected to an inlet of a second filter 34. An outlet of the second filter 34 is connected by an outlet line 35 to the check valve connecting line 24. The second port 32b of the second adapter valve 32 is connected through a bypass conduit 32c to a third port 32d. A fourth port 32e of the adapter valve 32 is connected to a second discharge line 36. The second adapter valve 32 and the filter 34 function in the same manner as the first adapter valve 22 and the filter 13 in both the normal mode of operation and the backwashing mode of operation. The second adapter valve 32 and the filter 34 provide a parallel path for increased filtering of the water flowing through the water supply and filtration system 30.

There is shown in the FIG. 5 the adapter valve 22 in accordance with the present invention and the connecting portions of the filter 13. The filter 13 includes a filter housing cover 40 which is normally connected to the source supply line 12 and the filter output line 14 as shown in the FIG. 1. As described below, the filter housing cover 40 is typically attached to an open top of a filter top of a filter housing enclosure 41 which includes a water filtration material (not shown). For example, the filter can be of a type available from Cross Manufacturing Co. Ltd. of Bath, Avon, United Kingdom. The filter housing cover 40 has a threaded inlet or first port 40a for threaded connection to the source supply line 12. The first port 40a is connected to one end 42a of a first internal passage 42 having an opposite end 42b open to a lower surface 43 of the cover 40. The cover 40 also includes an outlet or second port 40b which is connected to one end 44a of a second internal passage 44 having an opposite end 44b open to the lower surface 43. External threads 45 are formed on an outer surface of the cover 40 adjacent the lower end 43.

The filter housing enclosure 41 has an open upper end 46 with internal threads 47 formed on an interior wall thereof. The opening in the upper wall 46 is terminated below the threads 47 by a bottom wall 48. A third internal passage 49 is formed in the enclosure 41 and has a first end 49a open at the bottom wall 48. A fourth internal passage 50 is formed in the enclosure 41 and has a first end 50a extending above the bottom wall 48 and open. The external threads 45 mate with the internal threads 47 to retain the cover 40 on the enclosure 41. When the cover 40 is assembled on the enclosure 41, the lower surface 43 abuts the bottom wall 48 and the open opposite end 42b of the first internal passage 42 is aligned with the open first end 49a of the third internal passage 49. The opposite end 44b of the second internal passage 44 extends below the lower surface 43 and is sized to be inserted into the open first end 50a of the fourth internal passage 50. When the filter 13 is assembled in the above described manner, water flows through the source supply line 12 into the first port 40a, through the first internal passage 42 and the third internal passage 49 into the enclosure 41. The water flows through the filter material (not shown) and out through the fourth internal passage 50 and the second internal passage 44 to the second port 40b and the filter outlet line 14.

The adapter valve 22 is inserted between the filter housing cover 40 and the filter housing enclosure 41 to provide a filter backwashing function as described below. The adapter valve 22 includes an open upper end 51 having internal threads 52 formed in a sidewall of the opening. The opening in the upper end 52 terminates in a bottom wall 53 adjacent the bottom of the threads 52. A fifth internal passage 54 is formed in the adapter valve 22 and has a first end, the first port 22a, open to the bottom wall 53. The adapter valve 22 also has a lower end 55 having external threads 56 formed thereon. The lower end 55 is open and has a recessed bottom wall 57. The fifth internal passage 54 has an opposite end, the second port 22b, which is open to the bottom wall 57. A sixth internal passage 58 is formed in the adapter valve 22 and has a first end 58a extending above the bottom wall 53. The sixth internal passage 58 extends through the adapter valve 22 and has an opposite end 58b extending beyond the bottom wall 57. The upper end 51 of the adapter valve 22 is similar in configuration to the upper end 46 of the filter housing enclosure 41 and the lower end 55 is similar in configuration to the lower end 43 of the filter housing cover 40. Thus, when the external threads 56 engage the internal threads 47, the surface of the bottom end 55 abuts the bottom wall 48 and the opposite end 22b is aligned with the first end 49a. Similarly, the opposite end 58b is inserted into the first end 50a. The filter housing cover 40 then is assembled by engaging the external threads 45 with the internal threads 52 such that the lower surface 43 abuts the bottom wall 53, the opposite end 42b is aligned with the first end 22a and the opposite end 44b is inserted into the first end 58a.

The adapter valve 22 also includes a seventh internal passage 59 having a backwash port 59a as a first end and an opposite end 59b connected to the sixth internal passage 58. The check valve 25 is positioned in the second internal passage 58 between the first end 58a and the connection to the seventh internal passage 59.

As shown in the FIGS. 5 and 6, the adapter valve 22 includes a manually actuated rotary valve 60. The valve 60 is located in a cavity 61 formed in a sidewall of the adapter valve 22. The valve 60 includes a valve body 62 and a valve element 63 which are retained in the cavity 61 by a plate 64. The valve element 63 includes a cylindrical body 65 attached to one end of an actuator shaft 66 having a knob 67 attached to the other end thereof. As shown in the FIG. 5, the actuator shaft 66 extends through the plate 64 such that the knob 67 is positioned external of the side of the valve adapter 22. The actuator body 65 has a generally T-shaped passage 68 formed therein. The passage 68 has a first opening 68a formed in a sidewall of the body 65, a second opening 68b formed in the sidewall of the body approximately 90° from the first opening 68a and a third opening 68c formed in the sidewall approximately 90° from the second opening 68b and 180° from the first opening 68a. The valve body 62 has a central aperture 69 formed therein for receiving the valve element body 65. Extending radially from the central aperture 69 is a first passage 69a, a second passage 69b diametrically opposed to the first passage 69a and a third passage 69c extending at 90° to both the first and second passages.

When the valve body 62 is installed in the cavity 61, the first passage 69a is aligned with the fifth internal passage 54 at the first port 22a, the second passage 69b is aligned with the fifth internal passage 54 at the second port 22b and the third passage 69c is aligned with the fourth port 22e (not shown). Thus, water from the water source 11 flows through the source supply line 12 and into the first port 40a of the filter housing cover 40. The water then flows through the first internal passage 42, out of the opposite end 42b and into the first port 22a. The water flows through the fifth internal passage 54, into the first passage 69a, into the first opening 68a and through the T-shaped passage 68 of the valve element body 65. The water flows out of the second opening 68b and into the fifth internal passage 54 to the second port 22b. The water exits the second port 22b and enters the first end 49a of the third internal passage 49 in the filter housing enclosure 41. After the water flows through the filter material (not shown) in the filter 13, it exits from the fourth internal passage 50 through the first end 50a and into the second opposite end 58b of the sixth internal passage 58. The water flows through the sixth internal passage 58 and branches with a portion of the water entering the opposite end 59b of the seventh internal passage 59 and flowing out of the first end 59a into the Extrol tank line 27 and the Extrol tank 26 connected thereto. The remainder of the water flows through the check valve 25 and out of the first end 58a into the opposite end 44b of the second internal passage 44. The water flows through the second internal passage 44 and exits at the second port 40b into the filter outlet line 14 for flow into the storage tank 15. The above described flow path is the normal operation of the water supply and filtration system 20 shown in the FIGS. 2 and 3.

As shown in the FIG. 6, the third opening 68c is normally oriented opposite the third passage 69c. Thus, there is no water flow out of the third opening 68c and no water flow into the third passage 69c. When it is desired to backwash the filter 13, the knob 67 is grasped and rotated in a clockwise direction as indicated by an arrow 70 on a face of the knob. The knob 67 is rotated through 90° such that the second opening 68b is aligned with the third passage 69c, the third opening 68c is aligned with the second passage 69b, and the first opening 68a and the first passage 69a are blocked. Since the input from the water source 11 is now blocked by the valve element body 65, water under pressure in the Extrol tank 26 flows through the Extrol tank line 27 and into the first end 59a of the seventh internal passage 59. This water flows out of the opposite end 59b and into the sixth internal passage 58 to the opposite end 58b. Water flows from the opposite end 58b into the first end 50a of the fourth internal passage 50. This water now flows in the opposite direction through the filter material (not shown) backwashing the filter material and loosening any accumulation of deposits. The loosened deposits and the water flow out of the filter material and into the third internal passage 49 exiting the filter housing enclosure 41 at the first end 49a.

The water and the loosened deposits flow into the second port 22b, through the fifth internal passage 54 and into the second passage 69b. The water and the deposits then flow through the third opening 68a and through the passage 68 to exit the valve element body 65 at the second opening 68b. The water and deposits flow through the third passage 69c to the fourth port 22e (not shown) and the discharge line 23 (not shown). When the backflushing operation has been completed, the knob 67 is rotated in a counterclockwise direction back to the position shown in the FIG. 6 and the water supply and filtration system 20 again resumes supplying filtered water to the storage tank 15.

In accordance with the provisions of the patent statutes, the present invention has been described in what is considered to represent its preferred embodiment. However, it should be noted that the invention can be practiced otherwise than as specifically illustrated and described without departing from its spirit or scope.

What is claimed is:

1. An adapter valve apparatus for incorporating a backwashing system into a water filter, the water filter having a housing cover releasably attached to a housing enclosure retaining water filter material, the housing cover having an inlet port for connection to a source of water and an outlet port for connection to a water storage tank, the adapter valve apparatus comprising:

an adapter body having fastener means for respectively connecting said adapter body with a housing cover of a water filter and connecting said adapter body with a housing enclosure of the water filter that is releasably attached to the housing cover, said adapter body having a source port formed therein for fluid communication with an inlet port of the housing cover, a storage port formed therein for fluid communication with an outlet port of the housing cover, a filter inlet port for fluid communication with an inlet port of the housing enclosure, a filter outlet port for fluid communication with an outlet port of the housing enclosure, a backwash port formed therein for fluid communication with a backwash tank, a discharge port formed therein for fluid communication with a discharge line and a cavity formed therein in fluid communication with said source port, said filter port and said discharge port;

a check valve retained in said adapter body and positioned between said filter outlet port and said storage port and between said backwash port and said storage port for permitting fluid flow from said filter outlet port to said storage port and for blocking fluid flow from said storage port to said backwash port and to said filter outlet port; and a rotary valve retained in said cavity and actuatable between a normal mode permitting fluid flow from said source port to said filter inlet port and blocking fluid flow to said discharge port and a filter backwashing mode permitting fluid flow from said filter inlet port to said discharge port and blocking fluid flow to said source port.

2. The apparatus according to claim 1 wherein said adapter body has an internal passage connected between said source port and said filter inlet port and said cavity is positioned in said internal passage.

3. The apparatus according to claim 1 wherein said adapter body has an internal passage connected between said filter outlet port and said storage port and said check valve is positioned in said internal passage.

4. The apparatus according to claim 1 wherein said rotary valve includes a valve body with a central aperture formed therein and three passages extending from said central aperture, a first one of said passages being in fluid communication with said source port, a second one of said passages being in fluid communication with said filter inlet port and a third one of said passages being in fluid communication with said discharge port, a valve element body rotatably retained in said central aperture and having a generally T-shaped passage formed therethrough, and means for selectively rotating said valve element body between a normal mode position permitting fluid flow through said first and second passages and blocking fluid flow to said third passage and a filter backwashing mode position permitting fluid flow through said second and third passages and blocking fluid flow to said first passage.

5. The apparatus according to claim 4 wherein said rotary valve includes a knob and an actuator shaft having one end attached to said valve element body and an opposite end attached to said knob, said knob adapted to be grasped be a human hand for rotating said valve element body between said normal mode position and said filter backwashing mode position.

6. The apparatus according to claim 1 including a plate attached to said adapter body for retaining said rotary valve in said cavity.

7. An adapter valve apparatus for incorporating a backwashing system into a water filter, the water filter having a housing cover releasably attached to a housing enclosure retaining water filter material, the housing cover having an inlet port for connection to a source of water and an outlet port for connection to a water storage tank, the adapter valve apparatus comprising:
   an adapter body having fastening means for respectively connecting said adapter body with a housing cover of a water filter and connecting said adapter body with a housing enclosure of the water filter that is releasably attached to the housing cover, said adapter body having a source port formed therein for fluid communication with an inlet port of the housing cover, a storage port formed therein for fluid communication with an outlet port of the housing cover, a filter inlet port for fluid communication with an inlet port of the housing enclosure, a filter outlet port for fluid communication with an outlet port of the housing enclosure, a backwash port formed therein for fluid communication with a backwash tank, a discharge port formed therein for fluid communication with a discharge line and a cavity in fluid communication with said source port, said filter port and said discharge port;
   a check valve positioned between said filter outlet port and said storage port and between said backwash port and said storage port for blocking fluid flow from said storage port to said backwash port and said filter outlet port; and
   a rotary valve retained in said cavity, said rotary valve having a valve element body with a generally T-shaped passage formed therethrough, a valve body with a central aperture formed therein for rotatably retaining said valve element body and means for selectively rotating said valve element body between a normal mode position permitting fluid flow from said source port to said filter inlet port through said valve body and said T-shaped passage and blocking fluid flow to said discharge port and a filter backwashing mode position permitting fluid flow from said filter inlet port to said discharge port through said valve body and said T-shaped passage and blocking fluid flow to said source port.

8. The apparatus according to claim 7 including a plate attached to said adapter body for retaining said valve element body and said valve body in said cavity.

9. The apparatus according to claim 7 wherein said adapter body has a pair of generally parallel internal passages formed therein, one of said passages being connected between said source port and said filter inlet port and having said cavity positioned therein and another of said passages being connected between said filter outlet port and said storage port and having said check valve positioned therein.

10. The apparatus according to claim 9 wherein said adapter body has a third passage formed therein being connected between said backwash port and said another passage between said check valve and said filter outlet port.

11. A water filter apparatus comprising:
   a housing cover having a first port for connection to a source of water, a second port for connection to a water storage tank, a first internal passage with one end connected to said first port and an open opposite end, a second internal passage with a one end connected to said second port and an open opposite end and a first fastener means;
   a housing enclosure releasably attached to said housing cover and having a third passage with an open first end and an opposite end for communication with a water filter material, a fourth passage with an open first end and an opposite end for communication with the water filter material and a second fastener means; and
   an adapter valve for releasable connection between said housing cover and said housing enclosure, said adapter valve having a discharge port for connection to a discharge line, a third fastener means releasably engaged with said first fastener means, a fourth fastener means releasably engaged with said second fastener means, a fifth internal passage having one end in fluid communication with said open opposite end of said first passage and an opposite end in fluid communication with said open first end of said third passage, a sixth internal passage having one end in fluid communication with said open opposite end of said second passage and an opposite end in fluid communication with said open first end of said fourth passage, a seventh passage having one end for connection with a backwash tank and an opposite end in fluid communication with said sixth passage, at least one check valve positioned in said sixth passage between said first end of said sixth passage and said opposite end of said seventh passage for blocking fluid flow from said opposite end of second passage to said seventh passage and said fourth passage and at least one rotary valve positioned in said fifth passage and actuatable between a normal mode permitting water flowing into said first port to flow through said first passage, said fifth passage, said third passage, said fourth passage, said sixth passage and said second passage and out said second port and to said seventh passage from said sixth passage and a backwashing mode permitting fluid flowing into said opposite end of said seventh passage to flow through said seventh passage, said sixth passage, said fourth passage, said third passage and said fifth passage and out said discharge port.

12. The apparatus according to claim 11 including another housing enclosure releasable, attached to said housing cover and having a first internal passage forming a third passage with an open first end and an opposite end for communication with the water filter material, a second internal passage forming a fourth passage with an open first end and an opposite end for communication with the water filter material and a fastening means forming a second fastener means and wherein said adapter valve has a fifth fastener means releasably engaged with said second fastener means of said another housing enclosure, said fifth internal passage branches to a pair of said open opposite ends each in fluid communication with an associated one of said open first ends of said third passages, said sixth internal passage branches to a pair of said opposite ends each in fluid communication with an associated one of said open first ends of said fourth passages, said seventh passage branches to a pair of said opposite ends each in fluid communication with an associated one of said sixth passage branches, a pair of said check valves each positioned in an associated one of said sixth passage branches between said first end of said associated sixth passage branch and said opposite end of said associated seventh passage branch and a pair of rotary valves each positioned in an associated one of said fifth passage branches and actuatable between said normal mode and said backwashing mode.

* * * * *